United States Patent [19]

Kano

[11] 4,371,909
[45] Feb. 1, 1983

[54] HIGH VOLTAGE CONVERTER APPARATUS HAVING OVERVOLTAGE PROTECTION CIRCUITS FOR THYRISTORS

[75] Inventor: Takashi Kano, Hitachi, Japan

[73] Assignee: Hitachi, Ltd., Tokyo, Japan

[21] Appl. No.: 215,066

[22] Filed: Dec. 10, 1980

[30] Foreign Application Priority Data

Dec. 12, 1979 [JP] Japan .............................. 54-160404

[51] Int. Cl.³ ................................................ H02H 3/20
[52] U.S. Cl. ........................................ 361/91; 361/100; 361/103; 363/68
[58] Field of Search .................... 363/54, 57, 68; 307/252 L; 361/91, 100, 103

[56] References Cited

U.S. PATENT DOCUMENTS

| | | | |
|---|---|---|---|
| 3,424,948 | 1/1969 | Ravas | 361/91 |
| 3,599,075 | 8/1971 | Etter et al. | 363/68 X |
| 3,974,436 | 8/1976 | Timpe | 363/54 |
| 4,015,170 | 3/1977 | Barakaev et al. | 361/91 |
| 4,084,206 | 4/1978 | Leowald et al. | 363/54 X |
| 4,084,221 | 4/1978 | Ogata | 363/68 X |

*Primary Examiner*—Reinhard J. Eisenzopf
*Attorney, Agent, or Firm*—Antonelli, Terry & Wands

[57] ABSTRACT

A high voltage converter apparatus having overvoltage protection circuits for thyristors is disclosed in which, in order to protect series-connected thyristors in the converter against overvoltage, the converter is stopped when the overvoltage is generated by a trouble in the primary circuit of a pulse transformer, which is included in a gate circuit for the thyristors, and one of the overvoltage protection circuits, each of which is connected between an anode and a gate of a corresponding thyristor, is prevented from being operated when the overvoltage is generated by a trouble in the secondary circuit of the pulse transformer.

4 Claims, 3 Drawing Figures

HIGH VOLTAGE CONVERTER APPARATUS HAVING OVERVOLTAGE PROTECTION CIRCUITS FOR THYRISTORS

The present invention relates to a high voltage converter employing thyristors, and in more particular, to a high voltage converter including overvoltage protection circuits for thyristors.

Each arm of a high voltage converter comprises a plurality of tray modules connected in series, each tray module including a plurality of thyristors connected in series so as to withstand a high voltage applied to the converter. Voltage dividing circuits are also connected in parallel with the thyristors, respectively, to allot the same voltage to each thyristor. Such a high voltage converter is disclosed, for example, in U.S. Pat. No. ,084,221 to Ogata. Nevertheless, it often happens that a part of the thyristors receive an overvoltage due to variations in the characteristic of the thyristors and therefore these thyristors are damaged. In order to meet such a situation, an overvoltage protection circuit can be provided for each of the series-connected thyristors, is disclosed in, for example, U.S. Pat. No. 3,424,948, issued on Jan. 28, 1969.

The overvoltage protection circuit detects that an overvoltage is applied to the thyristor, and forces the thyristor to conduct. The operating voltage $V_p$ of the overvoltage protection circuit is set about three times as high as the allotted voltage $V_o$ of each thyristor, to prevent the overvoltage protection circuit from performing unnecessary operations. Accordingly, when the overvoltage protection circuit performs repetitive operations, the power loss in the voltage dividing circuit is extremely large. For example, when the voltage dividing circuit is operated with a capacitor having a capacitance C at a system frequency expressed by f, the power loss $P_o$ in normal operation of the thyristor and the power loss $P_p$ in repetitive operations of the overvoltage protection circuit are given by $P_o = 0.5\, fCV_o^2$ and $P_p = 0.5\, fCV_p^2$, respectively. When the operating voltage $V_p$, as mentioned above, is equal to three times the allotted voltage $V_o$, $P_p$ is equal to 9 $P_o$. Such an increase in power loss results in an anomalous temperature rise in the voltage dividing circuit, and there is a danger of the heat leading to damage not only to the voltage dividing circuit itself but also to various peripheral circuit elements.

It is an object of the present invention to provide a high voltage converter including overvoltage protection circuits which can completely protect thyristors against an overvoltage.

It is another object of the present invention to provide the above-mentioned converter equipped with means for preventing voltage dividing circuits from being overheated.

A first feature of the present invention, which can attain these objects, resides in that an overvoltage protection circuit is prevented from operating by short-circuiting a gate to cathode path of a thyristor through a thermal relay when a voltage dividing circuit is heated to a predetermined temperature due to repetitive operations of the overvoltage protection circuit, resulting in applying an overvoltage to a thyristor to damage it, which causes conduction of the damaged thyristor. However, each arm of the converter includes series connected plural thyristors the numbers of which are sufficient to withstand a voltage applied to each arm. Accordingly, the damage to a part of the thyristors within the tray module does not result in system failure. The above-mentioned operation is effective in the event of troubles in the secondary circuit of a pulse transformer, but is rather more injurious than beneficial in the event of troubles in the primary circuit. That is, since the pulse transformer is provided for each tray module, in a case where a trouble occurs in the primary circuit of one of the pulse transformers, for example, in a case where an ignition circuit fails to generate an ignition signal at a required time, all of the overvoltage protection circuits, which are provided for corresponding thyristors in the tray module, are operated. In this case, each voltage dividing circuit in the tray module is heated and all temperature relays are set to prevent all of the protection circuits from operating. Thus, the tray module receives the entire voltage across the length of the arm. Thus, all thyristors in the tray module would be damaged and forced to conduct. As mentioned above, the damage to a part of the thyristors in the tray module does not result in system failure, but the damage to all of the thyristors in the tray module inevitably leads to system failure.

Accordingly, a second feature of the present invention resides in that an instruction for stopping the converter is generated before the temperature relays operate in the event of troubles in the primary circuit. To this end, overvoltage detectors are connected in parallel with the thyristors, respectively. The detection level $V_D$ of the overvoltage detector is set lower than the operating voltage $V_p$ of the overvoltage protection circuit and higher than the allotted voltage $V_o$ of the thyristor. Thus, the overvoltage detectors surely detect the overvoltage each time the overvoltage protection circuit is operated. When the overvoltage detectors detect a predetermined number of repetitions of the overvoltage, an instruction for stopping the converter is generated. The overvoltage which occurs repetitively is selected in a range below that which the temperature does not operate.

As described above, according to the present invention, the overvoltage generated in the converter is classified into two groups, that is, the overvoltage caused by a trouble in the primary circuit of a pulse transformer in a gate circuit and that caused by a trouble in the secondary circuit of the pulse transformer, and respective protection means are provided for the above-mentioned two kinds of overvoltages, thereby protecting the converter completely against the overvoltage.

The present invention will become more apparent from the following description given in conjunction with the accompanying drawings, in which.

Figure 1:
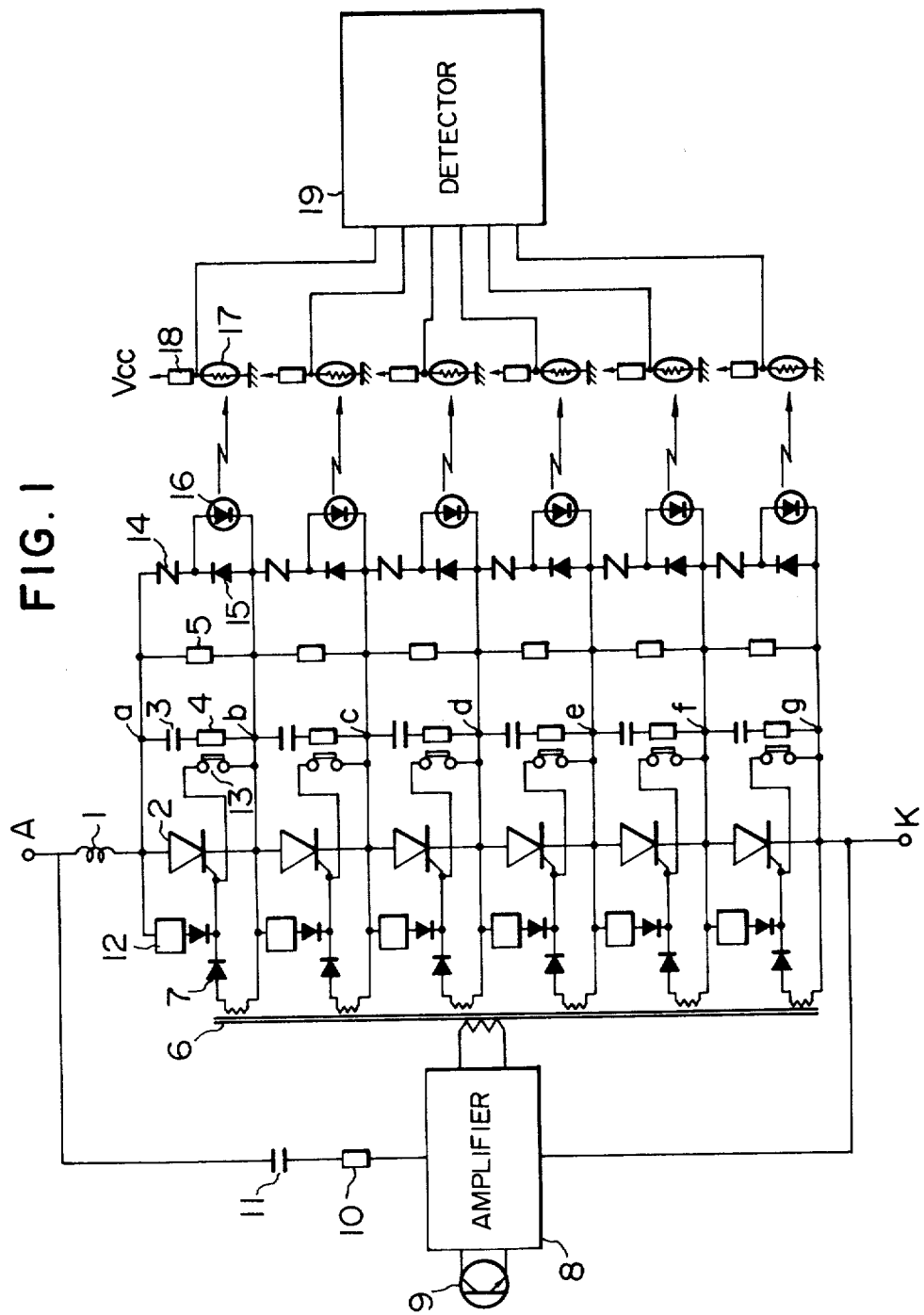
FIG. 1 is a circuit diagram for showing thyristors and overvoltage protection circuits thereof included in one tray module of an embodiment of a high voltage converter according to the present invention.

Normally, one arm of a high voltage converter includes a plurality of series-connected tray modules, each of which has such a structure as shown in FIG. 1. Referring to FIG. 1, six thyristors 2 in one tray module are connected in series, and the series-connected thyristors are, on the anode side thereof, connected in series with an anode reactor 1, which is connected to a power supply directly or through other tray modules. An a.c. voltage dividing circuit made up of a capacitor 3 and a resistor 4 and a d.c. voltage dividing circuit 5 are connected in parallel with a corresponding one of the thyristors, that is, the end terminals of each of these circuits are connected directly to the anode and cathode of the thyristor. These voltage dividing circuits are provided to allot the same voltage to each thyristor, and the a.c. voltage dividing circuit compensates for variations in the junction capacity of the thyristors, that is, variations in the capacitive impedance characteristic of the thyristors.

Every thyristor is fired simultaneously using a pulse transformer 6. That is, the outputs of six secondary windings of the transformer 6 are rectified respectively by six diodes 7, and then applied to the gates of the thyristors 2 as ignition signals. The primary winding of the pulse transformer 6 is connected to an amplifier 8, which is connected to a photoelectric conversion part 9. Thus, to the primary winding is applied an amplified output of the photoelectric conversion part 9. The part 9 receives a light ignition signal from a gate control device (not shown). Incidentally, a damping circuit, which is formed of a series circuit of a resistor 10 and a capacitor 11, is connected between an anode terminal A and the amplifier 8. Further, each thyristor is provided with a forward overvoltage protection circuit 12 which is connected between the anode and the gate of the thyristor, in order to protect the thyristor when an overvoltage is applied to the thyristor in the forward direction thereof.

In a case where the reverse blocking period of the thyristor is insufficient due to undesired operating conditions of the converter, for example, in a case where the forward blocking capacity is restored only in one of the thyristors and is not restored in the remaining thyristors, the thyristor restored to the forward blocking state receives the whole of a forward voltage applied to the converter. In this case, the forward overvoltage protection circuit 12 detects that the voltage applied between the anode and the cathode of the above-mentioned one thyristor exceeds a predetermined value, and fires the thyristor to prevent the forward overvoltage from damaging the thyristor.

The above-mentioned phenomenon takes place sporadically, and does not occur continually in every cycle. Accordingly, an allowable power loss of the a.c. voltage dividing resistor is, normally, determined based upon a power loss generated in normal operation from the economical point of view.

In a case where trouble is generated in the secondary circuit of the pulse transformer 6, for example, in a case where one of the diodes 7 becomes inoperative and therefore a normal ignition pulse is not applied to a corresponding thyristor, the thyristor is fired by the forward overvoltage protection circuit 12 every time the remaining thyristors are fired normally. This repetitive firing causes a temperature rise in the voltage dividing resistor 4, since a large current flows through the resistor 4 in the in-between periods of the repetitive operation of the overvoltage protection circuit 12 and the rate of the temperature rise of the resistor 4 due to the Joule effect in the in-between period is larger than the rate of temperature drop during each repetitive operation of the circuit 12 (where no current flows through the resistor 4); In this case, the a.c. voltage dividing resistor 4 connected to the above thyristor is overheated due to the generation of a loss exceeding the allowable power loss, and there is a danger of the spread of this trouble. In order to solve the above-mentioned problem, when the temperature of the a.c. voltage dividing resistor 4 is raised to a predetermined value, it is judged that the forward overvoltage protection circuit 12 is operated repetitively, and the temperature relay 13 short-circuits the gate-cathode path of the thyristor. Thus, the thyristor is broken down by the application of the forward overvoltage, and the spread of trouble due to the overheat of the resistor 4, which is caused by the continual operations of the forward overvoltage protection circuit 12, is prevented.

The above-mentioned method is effective in a case where a very small number of protection circuits 12 operate repetitively due to troubles in the secondary circuit of the pulse transformer 6. However, in a case where a trouble is generated in the primary circuit of the pulse transformer, for example, in the pulse amplifier 8, the tray module receives the entire voltage across the length of the arm all of the thyristors in the tray module require the repetitive operations of the forward overvoltage protection circuits 12, leading to a temperature rise in each resistor 4. When the temperature of the resistor 4 exceeds a certain value, each relay 13 operates. That is, the gate-cathode path of each thyristor is short-circuited so that each thyristor in the tray module is broken down by the overvoltage.

In order to solve such difficulties, according to the present invention, each thyristor in the tray module is further provided with a circuit for generating a light signal when the voltage between the anode and the cathode of the thyristor exceeds a predetermined value $V_D$. When the light signals corresponding to all the thyristors in the tray module are detected repetitively by a predetermined number, it is determined that the primary side of the pulse transformer 8 is causing trouble. The voltage for the detection by the predetermined number must be in a range where the temperature relay 13 does not operate. When such trouble occurs, protection means as the stoppage of the converter are taken.

The above-mentioned light-signal generating circuit and the operation thereof are based upon the fact that the operating level of the forward overvoltage protection circuit is two or three times higher than the voltage appearing across the thyristor in normal operation.

Now, the light-signal generating circuit will be explained below by reference to FIG. 1. Each of the thyristors 2 is connected in parallel with a corresponding series circuit of a nonlinear resistor 14 and a diode 15. Further, the diode 15 and a light emitting diode 16 make an anti-parallel connection to each other. The nonlinear resistor 14 is made of, for example, $ZnO_2$, and has a characteristic that an electric current flows abruptly through the resistor 14 when the voltage applied thereacross exceeds a predetermined value. Accordingly, the voltage $V_D$ at which the current begins to flow through the nonlinear resistor 14, is set a little lower than the operating level $V_P$ of the forward overvoltage protection circuit 12 and much higher than the voltage $V_O$ appearing across the thyristor in normal operation. Thus, when the forward overvoltage protection circuit 12 is operated, the light-emitting diode 16 is operated by the current flowing through the nonlinear resistor 14, and delivers the light signal. Light receiving elements, for example, photoconductive elements 17 are arranged in such a manner that the photoconductive elements 17 correspond to the light emitting diodes 16, respectively, but are electrically insulated from the side of the light emitting diodes 16, in order to receive the light signals from the diodes 16. Each of the photoconductive elements 17 is connected to a power source $V_{cc}$ through a resistor 18. Accordingly, the terminal voltage of each photoconductive element 17 is varied in accordance with the quantity of light received. The terminal voltages of all the photoconductive elements 17 are applied to a high-value detector 19. In a case where at least one of the light emitting elements 16 is not operated, the terminal voltage of a corresponding photoconductive element 17 is high, and therefore one of the inputs of the high-value detector 19 is in the level of "1".

While, in a case where all of the light emitting elements 16 are operated, the terminal voltage of every photoconductive element 17 is lowered, and all of the inputs of the high-value detector 19 take the level of "0". When the high-value detector 19 detects that the signals of the level of "0" are inputted a predetermined number of times, it is determined that the primary side of the pulse transfer 8 is causing trouble, and such protection means as the stoppage of the converter by tripping an input breaker are taken.

In the embodiment shown in FIG. 1, each of the nonlinear resistors 14 may be replaced by a resistor having no nonlinear characteristic, though it is difficult to set the operating level of the resistor appropriately.

Figure 2:
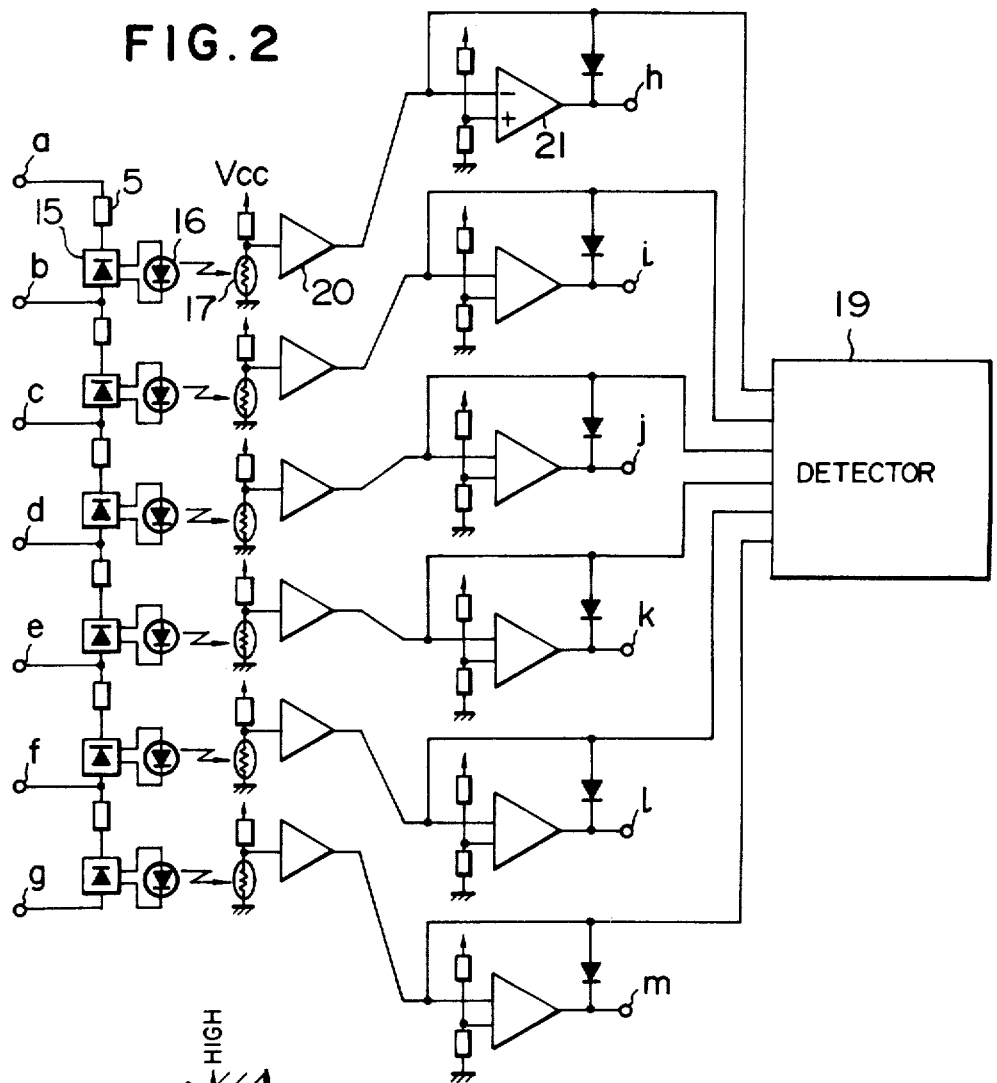
FIG. 2 is a circuit diagram for showing a main part of another embodiment of a high voltage converter according to the present invention.

FIG. 2 is a circuit diagram showing a main part of another embodiment of a converter according to the present invention.

In the embodiment shown in FIG. 2, an anti-parallel combination of a diode 15 and a light-emitting diode 16 is connected in series with a d.c. voltage dividing circuit 5, and photoconductive elements 17 corresponding to the above-mentioned light-emitting diodes 16 have the same arrangement and function as the photoconductive elements in the embodiment shown in FIG. 1. In the present embodiment, however, the terminal voltage of each photoconductive element 17 is amplified by an amplifier 20, and then sent to a comparator 21.

Figure 3:
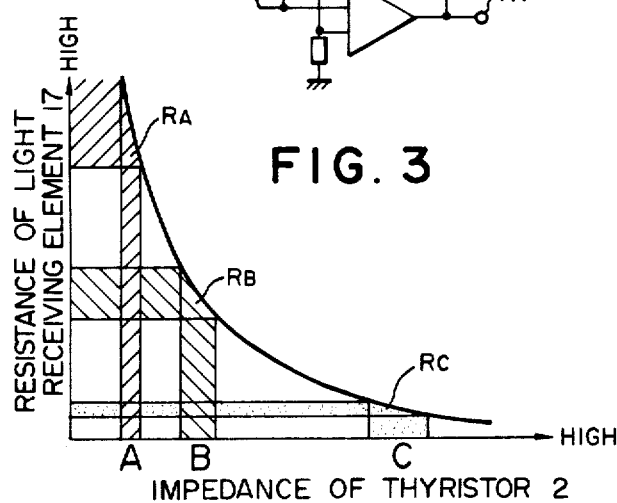
FIG. 3 is a graph showing a relation between the state of thyristor and the resistance of light receiving element.

Referring to FIG. 2, an electric current corresponding to a voltage applied to one of the thyristors 2 flows through a corresponding d.c. voltage dividing resistor 5 and light-emitting diode 16. Accordingly, when the thyristor 2 is broken down (i.e., the impedance of the thyristor is in an area A in FIG. 3), no current flows through the light-emitting diode 6. That is, the diode 6 does not deliver any light signal, and a corresponding photoconductive element 17 has a high resistance since the element 17 assumes a dark state such as indicated by a region $R_A$ in FIG. 3.

When the thyristor 2 operates normally (i.e., the impedance is in a region B in FIG. 3), an electric current corresponding to the terminal voltage of the thyristor 2 flows through the light-emitting diode 16. Accordingly, the photoconductive element 17 has a resistance corresponding to a region $R_B$ shown in FIG. 3. Further, in a case where the forward overvoltage protection circuit is operated repetitively, an electric current, which is two or three times larger than the current flowing through the emitting diode 16 when the thyristor 2 operates normally, flows through the light-emitting diode 16 in the in-between periods of the repetitive operation of the circuit 12 (i.e., in a region C in FIG. 3). Accordingly, the photoconductive element 17 has a very low resistance corresponding to a region $R_C$ shown in FIG. 3.

The comparator 21 compares an input signal with a preset reference voltage, and the output of the comparator 21 is reversed when the input signal is larger than the reference voltage. The reference voltage is laid between an input voltage corresponding to the region $R_A$ and that corresponding to the region $R_B$. When the light emitting diode emits in the normal thyristor condition, the photoconductive element 17 is in an intermediate resistance range ($R_B$) so that the terminal voltage of the element 17 is lower than the reference voltage. Thus, an output of the comparator 21 is at a logic level "1". On the other hand, the diode 16 does not emit, with the result that the resistance of the photoconductive element 17 is high (RA) so that the terminal voltage of the element 17 is higher than the reference level. Thus, the output of the comparator is at a logic level "0". When the thyristor 2 is broken down, the resistance of the photoconductive element 17 is changed from a value corresponding to the region $R_B$ to a value corresponding to the region $R_A$, and the output of the comparator 21 is changed from the level of "1" to the level of "0". Continuation of the logic level "0" for a certain time means breakdown of the thyristor. Thus, the outputs h through m of the comparator 21 can be used as thyristor-trouble detecting signals.

On the other hand, when the forward overvoltage protection circuit 12 is operated repetitively, the resistance of the photoconductive element 17 is brought into a low-resistance range (corresponding to the region $R_C$ shown in FIG. 3) in the in-between periods of the repetitive operations of the circuit 12, and an input signal of low level is applied to the high-value detector 19 which outputs logic level "0" when all the inputs are at a low level, and a logic level "1" for other input conditions. Accordingly, when the the diode 16 for all of the thyristors 2 are operated, the output of the high-value detector 19 is changed from the level of "1" to the level of "0". When the output of the detector 19 takes the level of "0" for a predetermined period, such protection means as the stoppage of the converter are taken to protect the converter.

Needless to say, in the embodiment shown in FIG. 2 is required an interlock signal for avoiding unnecessary operations of the thyristor-trouble detecting signals at a time when no voltage is applied to the thyristor value. The embodiment shown in FIG. 2 has an advantage that optical fibers for detecting the breakdown of thyristors are used also to detect the continual operations of the forward overvoltage protection circuits.

What is claimed is:

1. In a high voltage converter apparatus including a plurality of tray modules constituting one arm thereof, each tray module comprising:
   a plurality of thyristors connected in series;
   an ignition circuit for generating an ignition signal for said thyristors;
   a pulse transformer having a primary winding and a plurality of secondary windings, said primary winding being connected to said ignition circuit and each of said secondary windings being connected between a gate and a cathode of a corresponding one of said thyristors;
   a plurality of voltage dividing circuits, each of said voltage dividing circuits including an impedance element and being connected in parallel with a corresponding one of said thyristors;
   a plurality of forward overvoltage protection circuits, each of said forward overvoltage protection circuits being connected between an anode and a gate of a corresponding one of said thyristors;

means, including a plurality of temperature relays each provided in a corresponding one of said voltage dividing circuits, for short-circuiting the gate-cathode path of the associated thyristor when the temperature of the corresponding impedance element included in each of said voltage dividing circuits exceeds a predetermined value;

a plurality of overvoltage detectors, each connected in parallel with a corresponding one of said thyristors and having a detection level which is lower than the operating voltage of said overvoltage protection circuit and higher than the shared voltage of each of said thyristors during its normal operation for detecting an overvoltage condition in the corresponding thyristor; and high level detector means for generating a stopping instruction signal under such a condition that all of said overvoltage detectors detect simultaneously an overvoltage condition a predetermined number of repetition times.

2. A high voltage converter apparatus according to claim 1, wherein each of said overvoltage detectors comprises a series circuit of a nonlinear resistor and a light-emitting diode connected in parallel with said voltage dividing circuit and a photoconductive element for receiving a light signal from said light-emitting diode and wherein said high level detector means operates to detect the overload condition of a thyristor when the resistance value of the photoconductive element connected thereto is in a low resistance range.

3. A high voltage converter apparatus according to claim 2, wherein said high level detector means detects a breakdown of said thyristor when the resistance value of said photoconductive element is shifted from an intermediate resistance range to a high resistance range and is held at the high resistance range for a predetermined time.

4. A high voltage converter apparatus according to claim 1, wherein each of said overvoltage detectors comprises a light-emitting diode connected in series with a d.c. voltage dividing resistor included in said voltage dividing circuit, a photoconductive element for receiving a light signal from said light emitting diode, and a comparator for comparing a terminal voltage of said photoconductive element with a preset reference voltage.

* * * * *